United States Patent
Hitzeman et al.

(10) Patent No.: US 6,912,274 B2
(45) Date of Patent: Jun. 28, 2005

(54) SYSTEM ALLOWING TELEPHONE CUSTOMERS TO SEND AND RETRIEVE ELECTRONIC MAIL MESSAGES USING ONLY CONVENTIONAL TELEPHONIC DEVICES

(75) Inventors: Bonnie P. Hitzeman, Wheaton, IL (US); Donald L. Andruska, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 263 days.

(21) Appl. No.: 09/843,091

(22) Filed: Apr. 25, 2001

(65) Prior Publication Data

US 2002/0159573 A1 Oct. 31, 2002

(51) Int. Cl.[7] .............................................. H04M 1/64
(52) U.S. Cl. ............................... 379/88.17; 379/93.15; 704/275
(58) Field of Search ........................... 379/88.17, 88.18, 379/88.04, 88.14, 88.13, 93.15, 93.24, 67.1, 88.01; 370/352, 389, 401; 704/270, 271, 275, 9, 10

(56) References Cited

U.S. PATENT DOCUMENTS

| | | | | |
|---|---|---|---|---|
| 5,995,594 A | * | 11/1999 | Shaffer et al. | 379/88.12 |
| 6,212,265 B1 | * | 4/2001 | Duphorne | 379/142.15 |
| 6,373,926 B1 | * | 4/2002 | Foladare et al. | 379/88.13 |
| 6,415,021 B1 | * | 7/2002 | Oh | 379/88.13 |
| 6,430,177 B1 | * | 8/2002 | Luzeski et al. | 370/356 |
| 6,477,240 B1 | * | 11/2002 | Lim et al. | 379/67.1 |
| 6,529,500 B1 | * | 3/2003 | Pandharipande | 370/352 |

FOREIGN PATENT DOCUMENTS

JP    411252156    * 9/1999 ........... H04L/12/54

OTHER PUBLICATIONS

NOKIA 3520/3560 User Guid, 9355099, Jul. 2001, p. 103–105.*

* cited by examiner

Primary Examiner—Fan Tsang
Assistant Examiner—Ming Chow

(57) ABSTRACT

A novel communication system allows telephone customers to send and retrieve e-mail using only conventional telephone units. The system includes an "E-mail Device" (EMD), which is a special host computer for enabling customers to remotely create, send, retrieve and store e-mail messages. The EMD resides in the central office as part of a PSTN, or with an Internet Service Provider (ISP). Subscribers to the e-mail service can give calling parties the option of leaving e-mail messages when the subscribers' telephone lines are busy. Customers can also create and send e-mail messages by either dialing an access code to connect directly to the EMD, or dialing an ISP with a resident EMD. Once connected to the EMD, the customer is guided through menus to send either pre-stored or custom e-mail messages to a chosen customer, telephone number, or e-mail address. The message information and details are entered via the touch-tone pad, or by voice, followed with voice-to-text conversion. Retrieval of e-mail messages is also through conventional telephone units by placing a call to the EMD and specifying the Destination Number of interest. The EMD can require the entry of a PIN for security purposes. Audio versions of the e-mail messages are played for the customer. The customer can then store the text versions of the messages if desired.

33 Claims, 3 Drawing Sheets

SYSTEM ALLOWING TELEPHONE CUSTOMERS TO SEND AND RETRIEVE ELECTRONIC MAIL MESSAGES USING ONLY CONVENTIONAL TELEPHONIC DEVICES

BACKGROUND OF THE INVENTION

1. Field of the Invention

The present invention generally relates to improvements in the ability of users to send and retrieve electronic mail messages.

2. Background

As is well known, electronic mail ("e-mail") messages can be sent and received from almost any location using a computer (with MODEM) and an available telephone line. At the time of the initial filing of the application upon which this Letters Patent is based, over 308 million hourly e-mail messages, and approximately 2.7 trillion yearly e-mail messages, were being sent to computer users.

While e-mail messages have become very important in developed countries and nearly inextricably bound to many business operations and personal lives, a large number of potential e-mail users either do not use e-mail service at all, or only on very limited bases. The pool of untapped e-mail users is subsumed by telephone customers who receive more than 38 million hourly voice mail messages, and approximately 333 hundred million yearly voice mail messages.

Some do not engage in e-mail communications because they do not have the financial wherewithal to own or have access to, the necessary computer equipment. Others have heretofore been uninterested in engaging in e-mail communications either because they find the procedures necessary for conventional e-mail access cumbersome, or because they are "technophobes" who are intimidated by technology and perceived technological endeavors.

Additionally, there are many that would like to use e-mail service more frequently, but are temporarily without the use of the necessary computer equipment at times (e.g., while traveling, in environmentally awkward situations).

Recent approaches to the above-identified problems include special purpose miniature computing devices that conveniently plug into telephone jacks. Such devices typically have small alphanumeric keypads, which are often miniature versions of those found in desktop computers, a small Liquid Crystal Display (LCD), and an internal specially programmed processor. While these devices are capable of e-mail communication, they may nonetheless cost more than many are willing to spend for equipment which may not be easy to use, given the small, cramped nature of the keyboards and displays, and has little utility beyond sending and retrieving simple e-mail messages. Also, despite representations made by those selling the devices, such devices may not be user-friendly—especially for "technophobes."

In view of the above-identified problems, what is needed (but non-existent in the prior art) is a simple and inexpensive system for sending and retrieving e-mail messages, which does not require customers to use computers or special e-mail hardware.

SUMMARY OF THE INVENTION

In view of the aforementioned problems and deficiencies of the prior art, the present invention provides a method of creating and sending electronic mail ("e-mail") messages. The method at least includes the steps of connecting a telephone customer to an e-mail device (EMD) via only a telephone call from a conventional touch-tone telephone unit, upon connection of the customer to the EMD, providing the customer with a menu of options for e-mail creation and transmission, and via the EMD, constructing an e-mail message at least partially based upon input information input by the customer via the telephone unit. The method also at least includes the steps of in response to the customer's input, identifying a recipient of the e-mail message, storing the e-mail message, and sending the e-mail message to the identified recipient.

The present invention also provides a method of retrieving e-mail messages. This method at least includes the steps of connecting a telephone customer to an EMD via only a telephone call from a conventional touch-tone telephone unit, upon connection of the customer to the EMD, providing the customer with a menu of e-mail messages for which the customer is the intended recipient, and via the EMD, converting text information in an e-mail message to audio information. This method also at least includes the step of playing an audio version of an e-mail message to the customer.

The present invention further provides a system for creating and sending e-mail messages. The system at least includes a Public Switched Telephone Network (PSTN), an EMD, and at least one conventional touch-tone telephone unit adapted to connect a telephone customer to the EMD with a telephone call via the PSTN. The EMD at least includes a menu generator adapted to generate for the customer, a menu of options for e-mail creation and transmission, an e-mail message constructor adapted to construct an e-mail message at least partially based upon input information input by the customer via the telephone unit, an e-mail recipient identifier adapted to, in response to the customer's input, identify a recipient of the e-mail message, and an e-mail message memory adapted to store the e-mail message. The EMD also at least includes an e-mail message sender adapted to send the e-mail message to the identified recipient.

The present invention finally provides a system for retrieving e-mail messages. The system at least includes a PSTN, an EMD, and at least one conventional touch-tone telephone unit adapted to connect a telephone customer to the EMD with a telephone call via the PSTN. The EMD at least includes a menu generator adapted to generate for the customer, a menu of e-mail messages for which the customer is the intended recipient, a text-to-voice converter adapted to convert text information in an e-mail message to audio information, and an e-mail message player adapted to play an audio version of an e-mail message to the customer.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

General System

Figure 1:
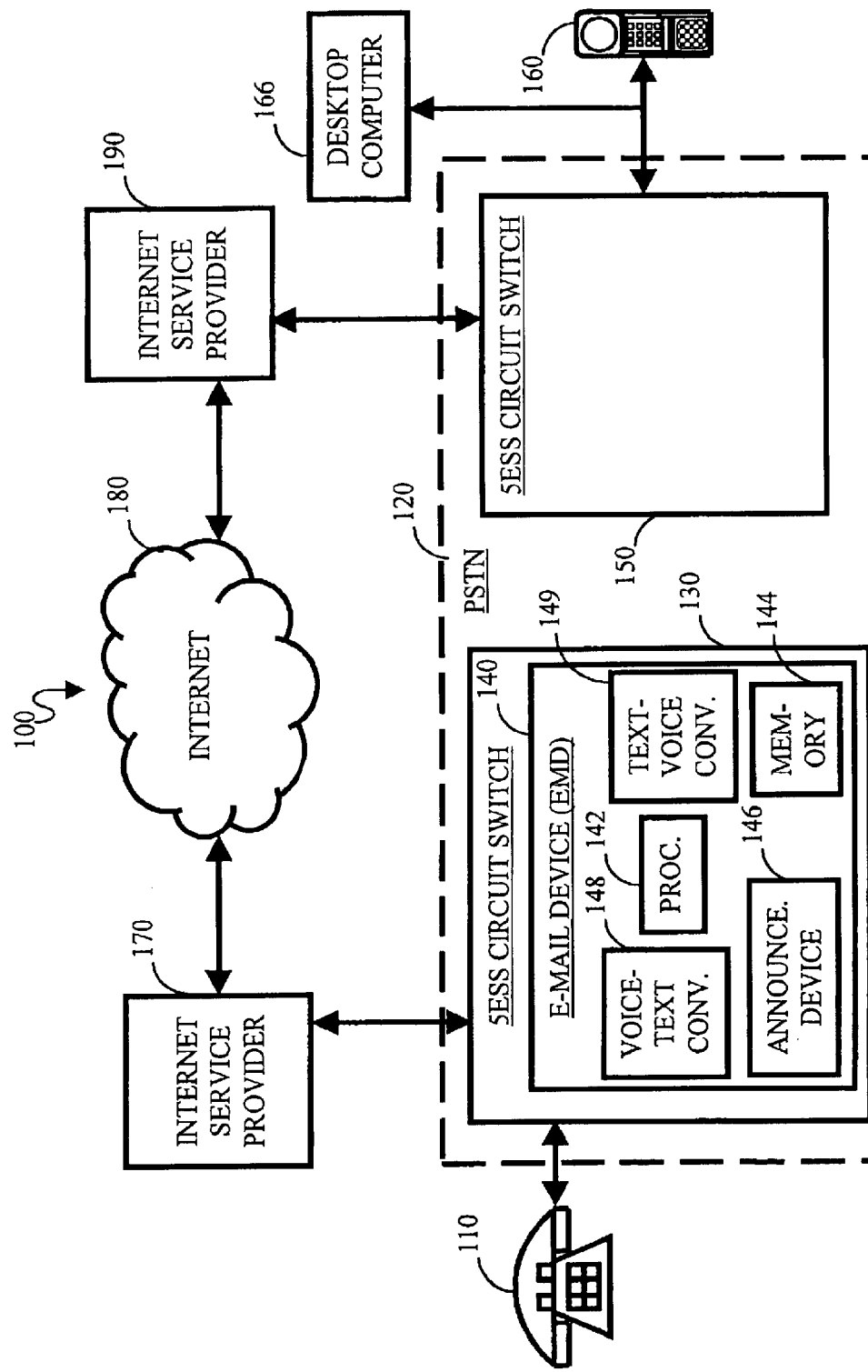
FIG. 1 is a schematic block diagram of the present-inventive telephone system which novelly allows customers to send and retrieve e-mail messages using only conventional touch tone telephone units.

A general schematic block diagram of the present-inventive e-mail creation, transmission and retrieval system 100 is shown in FIG. 1. In the system 100, customers can both send and receive e-mail messages with only conventional touch-tone telephones at their disposal. In the example of FIG. 1, the number 110 pertains to both a first telephone unit and a customer sending e-mail, while the number 160 pertains to both a second telephone unit and a customer retrieving e-mail. Those skilled in the art will appreciate that the telephone units can be of the wired or wireless variety.

The system 100 also nominally includes a Public Switched Telephone Network (PSTN) 120, which generally handles a large number of telephone calls emanating within and without the network, a wide area network such as the Internet 180, and one or more Internet Service Providers (ISPs) such as the ones 170 and 190. While a desktop computer 166 is also shown in FIG. 1, giving the customer 160 the option to retrieve e-mail messages with a computer, the system does not need endpoint computers.

In a PSTN like the one 120, there are several circuit switches (130, 150) for directing and connecting calls as is known in the art. Suitable switches include the 5ESS Switch available from Lucent Technologies, Inc., the assignee of this Letters Patent. The system 100 also novelly includes one or more E-Mail Devices (EMDs) 140 for the creation, storage, transmission, and retrieval of e-mail messages by customers sans endpoint computers. In the preferred embodiments, the EMD 140 (or EMDs) reside in either a circuit switch in a Local Office, or are under the control of an ISP. As such, customers wishing to send or retrieve e-mail messages using the present invention can access the EMD directly, or indirectly via an ISP known to have an EMD. The EMD is accessible both by conventional telephone and by computer.

The EMD 140 is not really a single device, but a special purpose host computer system which allows the "thinnest" of clients (mere telephone users) to perform heavy-duty e-mail-related computer functions. Among the necessary components for an EMD that functions in accordance with the present invention, are a processor or processors 142, a large memory 144 which may be distributive, an announcement device 146, a voice-to-text converter 148, and a text-to-voice converter 149.

The processor 142 controls the overall operation of the EMD and performs important functions related to e-mail creation, transmission and retrieval. The memory 144 stores the actual e-mail messages. The announcement device 146 converts menus and other customer instructions into sounds that can be heard by a customer in communication with the EMD. The voice-to-text converter 148 is a high-quality voice recognition system that converts voice information from the customer to commands and data to be included as text in the body of e-mail messages. The text-to-voice converter 149 converts text into audio signals to be played for customers who are in the process of retrieving e-mail messages by telephone, or those customers who wish to review a recently created e-mail message prior to sending it.

A customer who has e-mail can retrieve it either by telephone or other means such as an endpoint computer. The invention will now be described with respect to the separate operations of creating and sending an e-mail message, and retrieving an e-mail message.

A subscriber to a service for producing and sending e-mail messages en masse using the present invention, can pre-store skeletal e-mail messages which require entry of specific information (e.g., recipients' names, dates and places of appointments for reminder purposes).

E-Mail Creation and Transmission

Figure 2:
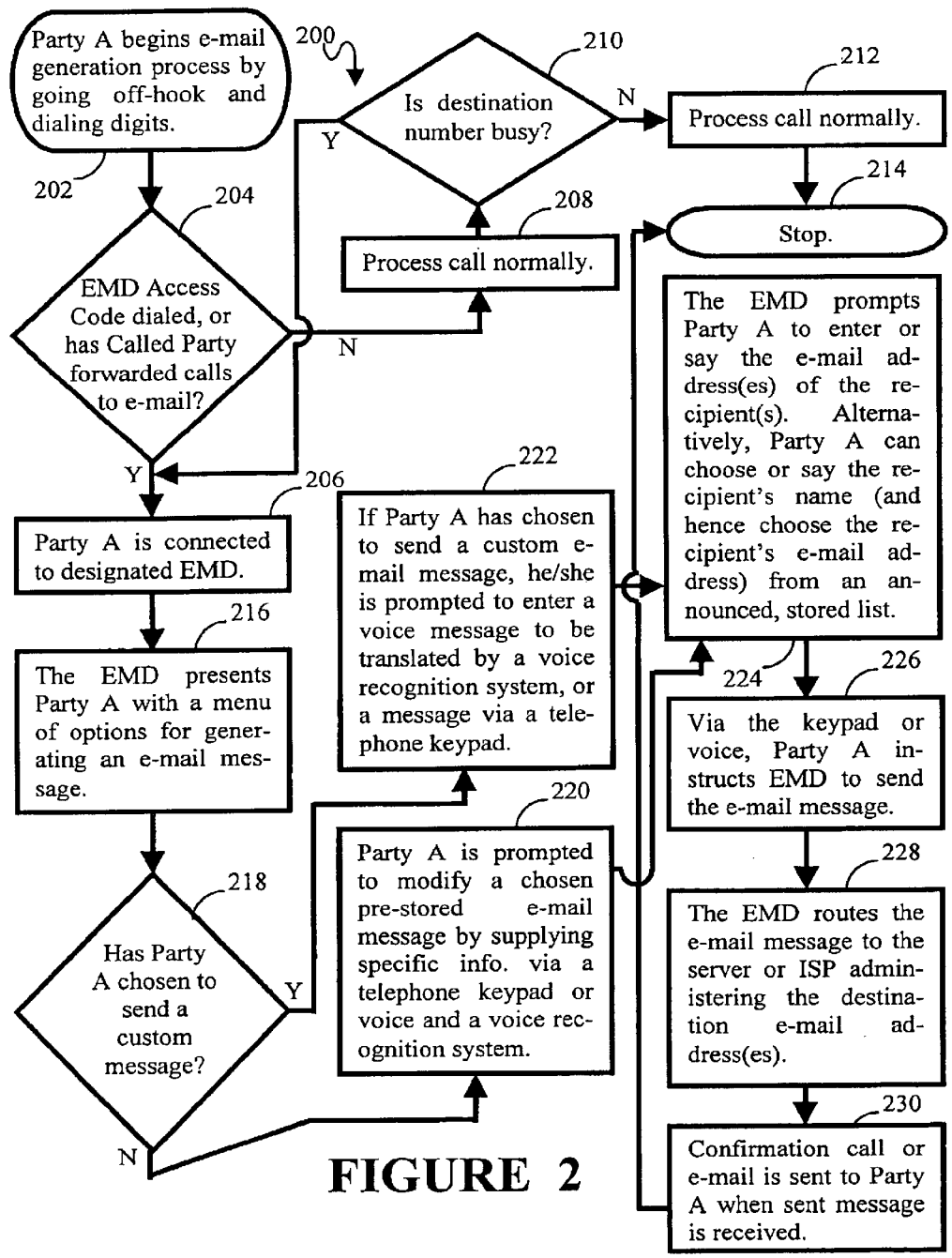
FIG. 2 is a flow chart of the process of generating and sending e-mail messages according to the present invention.

The e-mail message creation and transmission algorithm 200 is detailed in FIG. 2.

A customer designated as "Party A," who wishes to send an e-mail message according to the present invention starts (Step 202) the algorithm 200 by going off-hook with only a conventional touch-tone telephone, and either dialing an access code (e.g., "#88") or the telephone number to an ISP with a resident EMD. If Party A has input the appropriate digits, he or she is connected to the EMD (Steps 204 and 206). If the appropriate digits have not been entered for EMD connection, the call is processed as a normal call (Steps 204 and 208). The system will also require Party A to enter a security code such as a Personal Identification Number (PIN) in order to access the service. Either by design choice of the system 100, or by choice of individual customers, calling parties can be automatically forwarded to an EMD when the called party's number is busy (Step 210 followed by Step 206). If the called party's number is not busy and the calling party has not requested connection to an EMD, the telephone call is processed normally to the end of the algorithm (Steps 212 and 214).

After Step 206, the EMD presents Party A with a menu of options concerning the creation and transmission of e-mail messages (Step 216). Party A chooses to send either a pre-stored message or a customized message in Step 218. In Step 220, Party A is prompted to enter information to modify a pre-stored message in Step 220. The information is entered either via the alphanumeric keypad (Dual Tone, Multi-frequency or DTMF signals) of the telephone unit, or by converting voice signals into text. If Party A has chosen to send a custom e-mail message, he or she is prompted to enter the custom information by keypad or voice (Step 222).

In Step 224, Party A is prompted to enter or say the name of the e-mail message recipient, or the recipient's e-mail address or telephone number. Where Party A is a subscriber with an existing e-mail account using the present invention, he or she can also pre-store a table matching potential e-mail recipients with e-mail addresses and/or telephone numbers. After Party A identifies the e-mail message recipient (Step 224), he or she instructs the EMD to deliver the e-mail message to the intended recipient (Step 226).

In Step 228, the EMD routes the e-mail to the intended recipient. In some cases, the intended recipient may have all of his or her e-mail message stored (at least temporarily) in the EMD. Following the routing of the e-mail message, the EMD sends a confirmation report or message to Party A (Step 230). The confirmation message may be delivered via a telephone call or e-mail message. The confirmation message can also be sent upon retrieval of the message by Party B.

E-Mail Retrieval

Figure 3:
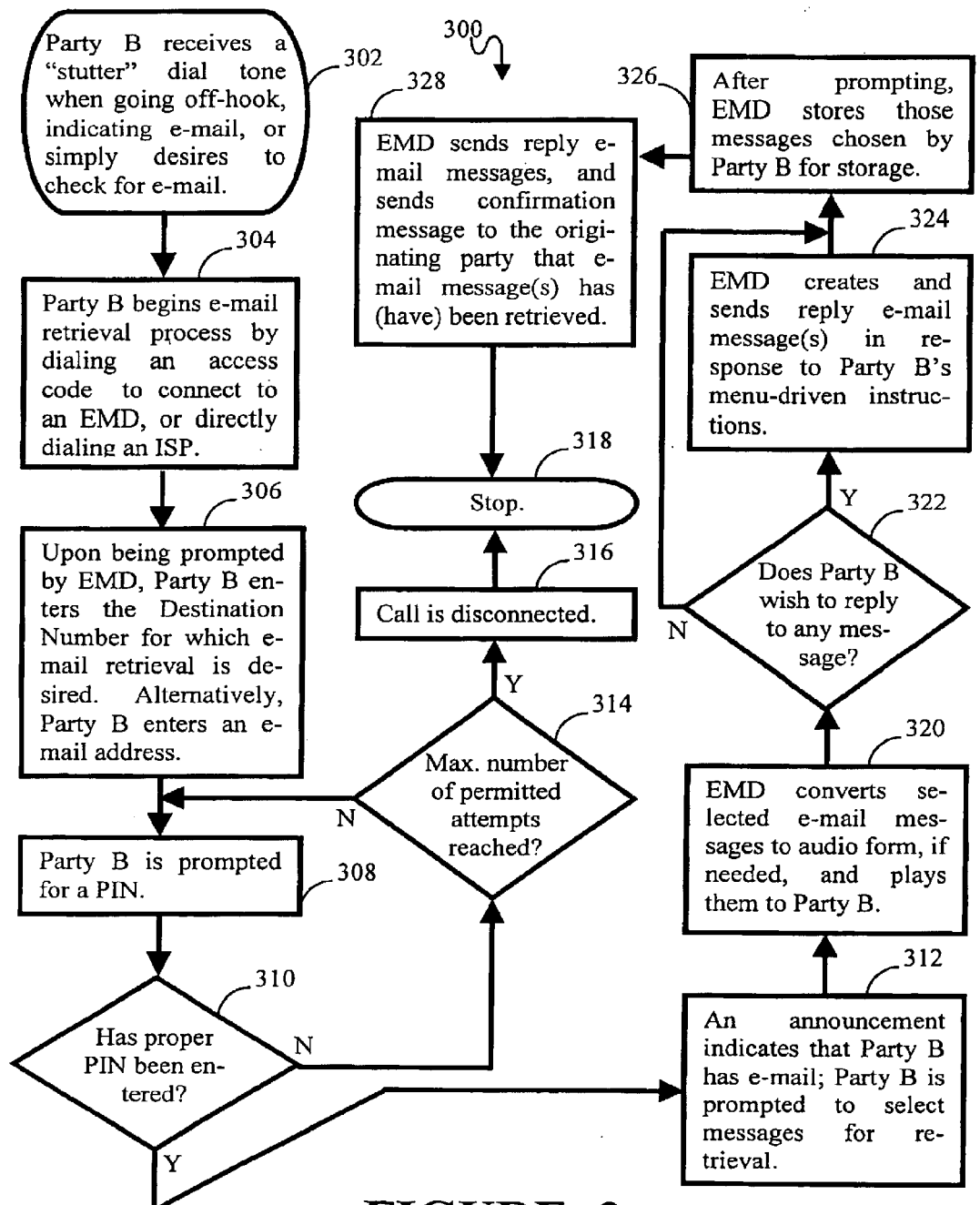
FIG. 3 is a flow chart of the process of retrieving e-mail messages according to the present invention.

The e-mail message retrieval algorithm 300 is detailed in FIG. 3. The process has many similarities to the e-mail creation and transmission process detailed supra.

The algorithm 300 is started (Step 302) in multiple ways. A "stutter" dial tone can be delivered when the e-mail recipient customer (Party B) goes off-hook with a conventional touch-tone telephone unit connected to a designated calling line. Or, Party B can simply decide to check for e-mail by entering an access code (e.g., "#88") to connect to an EMD, or by directly dialing an EMD-enabled ISP (Step 304). Alternatively, all incoming calls can be preceded by a "distinctive ring" (or "distinctive ringing") pattern to notify Party B that he/she has e-mail. In yet another variation, Party B can be notified with an isolated distinctive ring pattern that is not succeeded by an actual telephone call.

Upon being prompted by the EMD, Party B enters the Destination Number (DN) for which e-mail retrieval is desired (Step 306). The DN is preferred to other identification means such as Automatic Number Identification (ANI), since Party B may not be calling from the number for which e-mail retrieval is desired. For security purposes, Party B (an e-mail subscriber according to the present-inventive system) is then asked to enter a security code such as a PIN to ensure that Party B is entitled to access the desired e-mail box (Steps 308 and 310). Party B is given a specified number of attempts to enter the correct PIN for the DN (Steps 314 and 308), after which, the call is disconnected, and the session ends (Steps 316 and 318).

If the correct PIN has been timely entered, Party B is notified that he or she has e-mail, and prompted to select the message or messages for retrieval (Step 312). In the preferred embodiment, the EMD converts the selected messages to audio form and plays them for Party B to hear (Step 320).

In Step 322, Party B can decide to send reply messages to any of the retrieved e-mail messages. If reply messages are desired, Party B creates those message in the same manner as in the algorithm 200 (Step 324). In Step 326, the EMD stores those messages chosen by Party B for storage, along with any reply messages created. Finally, the EMD sends all reply messages, and sends confirmation messages to the e-mail message senders indicating that their messages have been received by the intended recipient (Step 328), whereupon the algorithm stops (Step 318).

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of creating and sending electronic mail ("e-mail") messages, said method comprising the steps of:
   a) connecting a telephone customer to an e-mail device (EMD) via only a telephone call from a touch-tone telephone unit, wherein said EMD resides in a central office of a Public Switched Telephone Network or is under the domain of an Internet Service Provider;
   b) upon connection of said customer to said EMD, providing said customer with a menu of options for e-mail creation and transmission, said menu of options including an option to create a new e-mail message, an option to select an e-mail message from a list of pre-recorded e-mail messages and stored in said EMD, and an option to modify any one of said pre-recorded e-mail messages;
   c) via said EMD, constructing an e-mail message at least partially based upon input information input by said customer via an alphanumeric keypad of said telephone unit;
   d) in response to said customer's input, identifying a recipient of said e-mail message, the identity of said recipient corresponding to at least one of a Destination Telephone Number or an e-mail address;
   e) storing said e-mail message temporarily in said EMD;
   f) sending said e-mail message to the identified recipient via a wide area network, said wide area network comprising an Internet; and
   g) generating a confirmation report for delivery to said customer, said confirmation report confirming the retrieval of said e-mail message by the recipient.

2. The method in claim 1, wherein the information input by said customer includes voice information, and said method further comprises the step of:
   converting said voice information from said telephone unit to text information.

3. The method in claim 1, wherein step a) is triggered by said customer dialing an access code via said telephone unit.

4. The method in claim 3, further comprising the step of said customer dialing a security code.

5. The method in claim 1, wherein step a) is triggered at the request of said customer when a dialed Destination Telephone Number is "busy."

6. The method in claim 1, wherein said e-mail message contains a text portion and a file attachment.

7. The method in claim 6, wherein said file attachment contains audio information input by said customer.

8. A method of retrieving electronic mail ("e-mail") messages, said method comprising the steps of:
   a) connecting a telephone customer to an e-mail device (EMD) via only a telephone call from a touch-tone telephone unit;
   b) upon connection of said customer to said EMD, providing said customer with a menu of e-mail messages for which said customer is the intended recipient;
   c) via said EMD, converting text information in an e-mail message to audio information;
   d) playing an audio version of an e-mail message to said customer;
   e) generating a confirmation report for delivery to a sender of an e-mail message, said confirmation report confirming the retrieval of said e-mail message by said telephone customer;
   f) providing said customer with a menu of options for reply e-mail creation and transmission, said menu of options including an option to create a new reply e-mail message, an option to select a reply e-mail message from a list of pre-recorded reply e-mail messages and stored in said EMD, and an option to modify any one of said pre-recorded reply e-mail messages;
   g) via said EMD, constructing a reply e-mail message at least partially based upon input information input by said customer via an alphanumeric keypad of said telephone unit;
   h) in response to said customer's input, identifying a recipient of said reply e-mail message, the identity of said recipient corresponding to at least one of a Destination Telephone Number and an e-mail address;
   i) storing said reply e-mail message temporarily in said EMD;
   j) sending said reply e-mail message to the identified recipient via a wide area network, said wide area network comprising an Internet; and
   k) generating a confirmation report for delivery to said customer, said confirmation report confirming the retrieval of said reply e-mail message by the recipient.

9. The method in claim 8, further comprising the step of:
   re-storing a retrieved e-mail message for future access by the intended recipient.

10. The method in claim 8, wherein reply e-mail message information input by said customer includes voice information, and said method further comprises the step of:
    converting voice information from said telephone unit to text information.

11. The method in claim 8, wherein said reply e-mail message contains a text portion and a file attachment.

12. The method in claim 11, wherein said file attachment contains audio information input by said customer.

13. The method in claim 8, further comprising the steps of:
    determining whether said customer is an intended recipient of an e-mail message based upon the customer's Calling Party Number.

14. The method in claim 8, wherein step a) is triggered by said customer dialing an access code via said telephone unit.

15. The method in claim 14, further comprising the step of said customer dialing a security code.

16. The method in claim 8, further comprising the step of: prior to step a), notifying a customer that he or she has e-mail by a "distinctive ringing" pattern.

17. The method in claim 8, further comprising the step of: prior to step a), notifying a customer that he or she has e-mail by a "stutter" dial tone.

18. A system for creating and sending electronic mail ("e-mail") messages, said system comprising:
    a Public Switched Telephone Network (PSTN);
    an e-mail device (EMD), wherein said EMD resides in a central office of said PSTN or is under the do-main of an Internet Service Provider; and
    at least one touch-tone telephone unit adapted to connect a telephone customer to said EMD with a telephone call via said PSTN;
    wherein said EMD comprises:
    a menu generator adapted to generate for said customer, a menu of options for e-mail creation and transmission, said menu of options including an option to create a new e-mail message, an option to select an e-mail message from a list of pre-recorded e-mail messages and stored in said EMD, and an option to modify any one of said pre-recorded e-mail messages;
    an e-mail message constructor adapted to construct an e-mail message at least partially based upon input information input by said customer via an alphanumeric keypad of said telephone unit;
    an e-mail recipient identifier adapted to, in response to said customer's input, identify a recipient of said e-mail message, the identity of said recipient corresponding to at least one of a Destination Telephone Number or an e-mail address;
    an e-mail message memory adapted to store said e-mail message;
    an e-mail message sender adapted to send said e-mail message to the identified recipient via a wide area network, said wide area network comprising an Internet; and
    a confirmation report generator adapted to generate a confirmation report for delivery to said customer, said confirmation report confirming the retrieval of said e-mail message by the recipient.

19. The system in claim 18, wherein the information input by said customer includes voice information, and said system further comprises:
    a voice-to-text converter adapted to convert voice information from said telephone unit to text information.

20. The system in claim 18, wherein said system is adapted to connect said telephone unit to said EMD by said customer dialing an access code via said telephone unit.

21. The system in claim 20, wherein said system is further adapted to connect said telephone unit to said EMD by said customer dialing a security code via said telephone unit.

22. The system in claim 18, wherein said system is adapted to connect said telephone unit to said EMD at the request of said customer when a dialed Destination Telephone Number is "busy."

23. The system in claim 18, wherein said e-mail message contains a text portion and a file attachment.

24. The system in claim 23, wherein said file attachment contains audio information input by said customer.

25. A system for retrieving electronic mail ("e-mail") messages, said system comprising:
    a Public Switched Telephone Network (PSTN);
    an e-mail device (EMD), wherein said EMD resides in a central office of said PSTN or is under the do-main of an Internet Service Provider; and
    at least one touch-tone telephone unit adapted to connect a telephone customer to said EMD with a telephone call via said PSTN;
    wherein said EMD comprises:
    an intended recipient identifier adapted to determine whether said customer is an intended recipient of an e-mail message based upon the customer's Calling Party Number;
    a menu generator adapted to generate for said customer, a menu of e-mail messages for which said customer is the intended recipient;
    a text-to-voice converter adapted to convert text information in an e-mail message to audio information;
    an e-mail message player adapted to play an audio version of an e-mail message to said customer;
    a confirmation report generator adapted to generate a confirmation report for delivery to a sender of an e-mail message, said confirmation report confirming the retrieval of said e-mail message by said customer;
    a menu generator adapted to generate for said customer, a menu of options for reply e-mail creation and transmission, said menu of options including an option to create a new reply e-mail message, an option to select a reply e-mail message from a list of pre-recorded reply e-mail messages and stored in said EMD, and an option to modify any one of said pre-recorded reply e-mail messages;
    a reply e-mail message constructor adapted to construct a reply e-mail message at least partially based upon input information input by said customer via an alphanumeric keypad of said telephone unit;
    a reply e-mail recipient identifier adapted to, in response to said customer's input, identify a recipient of said reply e-mail message, the identity of said recipient corresponding to at least one of a Destination Telephone Number or an e-mail address;
    a reply e-mail message memory adapted to store said reply e-mail message;
    a reply e-mail message sender adapted to send said reply e-mail message to the identified recipient via a wide area network; and
    said confirmation report generator being adapted to generate a confirmation report for delivery to said customer, said confirmation report confirming the retrieval of said reply e-mail message by the recipient.

26. The system in claim 25, wherein said EMD further comprises:
    e-mail message memory adapted to re-store a retrieved e-mail message for future access by the intended recipient.

27. The system in claim 25, wherein reply e-mail message information input by said customer includes voice information, and said EMD further comprises:

a voice-to-text converter adapted to convert voice information from said telephone unit to text information.

28. The system in claim 25, wherein said reply e-mail message contains a text portion and a file attachment.

29. The system in claim 28, wherein said file attachment contains audio information input by said customer.

30. The system in claim 25, wherein said system is adapted to connect said telephone unit to said EMD by said customer dialing an access code via said telephone unit.

31. The system in claim 30, wherein said system is further adapted to connect said telephone unit to said EMD by said customer dialing a security code via said telephone unit.

32. The system in claim 25, wherein said system is adapted to notify a customer that he or she has e-mail by a "distinctive ringing" pattern.

33. The system in claim 25, wherein said system is adapted to notify a customer that he or she has e-mail by a "stutter" dial tone.

* * * * *